United States Patent [19]

MacDougall et al.

[11] Patent Number: 4,698,725

[45] Date of Patent: Oct. 6, 1987

[54] PRESSURE SENSITIVE INTERRUPTERS FOR CAPACITORS

[75] Inventors: Frederick W. MacDougall, Marion; Thomas A. Murphy, New Bedford, both of Mass.

[73] Assignee: Aerovox Incorporated, New Bedford, Mass.

[21] Appl. No.: 842,642

[22] Filed: Mar. 21, 1986

[51] Int. Cl.[4] ........................ H01G 1/11; H01G 1/06

[52] U.S. Cl. .................................... 361/272; 361/433

[58] Field of Search ............. 361/15, 272, 275, 433 V, 361/433 H, 433 W, 306

[56] References Cited

U.S. PATENT DOCUMENTS 3,248,617 4/1966 Hynes et al. ........................ 361/306
3,553,542 8/1969 Netherwood ....................... 317/247
4,059,848 11/1977 Koel et al. .......................... 361/272
4,106,068 8/1978 Flanagan .............................. 361/15
4,107,758 8/1978 Shirn et al. .......................... 361/275
4,186,417 1/1980 Grahame .............................. 361/15
4,209,815 6/1980 Rollins et al. ......................... 361/15
4,240,126 12/1980 Sanvito ............................... 361/274
4,286,302 8/1981 Owens et al. ......................... 361/15
4,486,809 12/1984 Deak et al. .......................... 361/272
4,586,107 4/1986 Price .................................. 361/272

FOREIGN PATENT DOCUMENTS

83/104404.5 4/1983 European Pat. Off. .

*Primary Examiner*—Donald A. Griffin

[57] ABSTRACT

A capacitor is electrically disabled to limit internal pressure buildup by attaching its electrical terminals to a first wall portion that bulges in a predetermined direction under internal pressure, providing electrical connections between the terminals and the capacitive element, and associating with a second wall portion (that does not move in the predetermined direction under internal pressure) a disconnect means such that when the first wall portion bulges, the terminals exert a force in the predetermined direction on the connections, which are then severed by a resisting force exerted by the disconnect means.

In another aspect, reconnection is prevented by having each electrical terminal connected by a conductor via a predefined pathway to the capacitive element, and providing means for blocking the pathway following disconnection.

23 Claims, 8 Drawing Figures

PRESSURE SENSITIVE INTERRUPTERS FOR CAPACITORS

BACKGROUND OF THE INVENTION

This invention relates to pressure sensitive circuit interrupts in electical capacitors.

Deterioration of a liquid dielectric capacitor generates gases that increase the internal pressure within the sealed capacitor can, causing the walls to bulge and eventually rupture. To prevent rupture and subsequent leakage of the liquid dielectric, pressure sensitive interrupters are used to cause electrical disconnection of the external capacitor terminals from the capacitive element contained within the can.

In previous capacitors employing interrupters (as disclosed, for example, in Rayno, U.s. Pat. No. 3,377,510) the terminals are connected to rivets whose tips extend through holes in an insulating interrupter panel. Foil tabs, connected to the capacitive element, are spot welded to the rivet tips on a side of the interrupter panel opposite the terminals. As the cover of the can bulges, the terminals move outward, drawing the interrupter panel and foil tabs after it. Eventually the motion of the interrupter panel is resisted by downward-facing projections on the cover, causing the welds to break; gases cease to be generated and can rupture is prevented. The cover must often bulge ½ inch or more before the welds break.

On occasion, after the welds have broken, the heated gases contract, or dissipate, or are resorbed, permitting the can cover and terminal rivets to settle inward. If the holes in the panel are still aligned with the rivets, there may be physical reconnection between the rivets and the tabs through the holes or, in some cases, electrical arcing between them.

SUMMARY OF THE INVENTION

A general feature of the invention is a capacitor in which (a) electrical terminals are attached to a first wall portion that bulges in a predetermined direction under internal pressure, (b) electrical connections connect the terminals to the capacitive element, and (c) a second wall portion (that does not move in the predetermined direction under internal pressure) is associated with disconnect means such that when the first wall portion bulges, the terminals exert a force in the predetermined direction on the electrical connections which are then severed by a resisting force exerted by the disconnect means.

As a result, the capacitor is electrically disconnected quickly with a relatively small amount of cover bulge. The interruption device is simple and easy to fabricate.

Preferred embodiments of the invention include the following features. The disconnect means includes (a) an insulating panel interrupter that is movable in the predetermined direction and has holes through which the terminals extend, and (b) projections extending from the second wall portion into the interior of the capacitor body and located between the interrupter means and the first wall portion. The electrical connections include breakable connections located on a side of the interrupter opposite the first wall portion and the breakable connections are configured to prevent the conductors from passing through the holes. The first wall portion is the cover of a capacitor can, and the second wall portion includes the side walls of the can. The projections are indentations in the side walls which have inclined surfaces to cause the interrupter to move in the opposite direction from the predetermined direction when the capacitor is subjected to internal pressure.

Another general feature of the invention is a capacitor in which each electrical terminal is connected by a conductor via a predefined pathway to the capacitive element, means are provided for disconnecting the electrical terminals from the element upon failure of the capacitor, and means are provided for blocking the pathway to prevent reconnection of the conductor following disconnection.

As a result, the possibility of the capacitor becoming reconnected is reduced.

Preferred embodiments of the invention include the following features. The conductor is severed with a gap between the severed ends, and an insulative member is interposed in the gap. The insulative member is a rigid panel that includes an aperture defining a portion of the predetermined pathway, and the aperture is dislocated to block the pathway by rotation of the insulative member.

Other feataures and advantages of the invention will be apparent from the following description of the preferred embodiment, and from the claims.

DESCRIPTION OF THE PREFERRED EMBODIMENT

We first briefly describe the drawings.

Drawings

Structure

Figure 1:
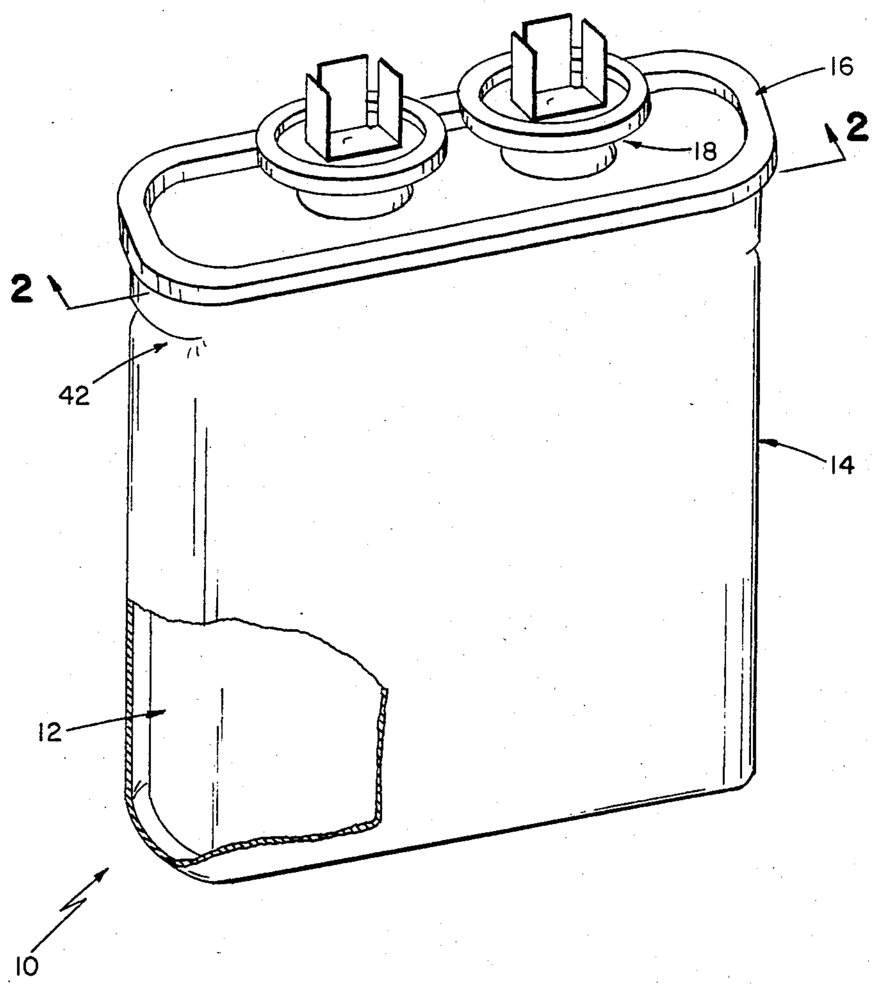
FIG. 1 is a perspective view, partially cut away, of a capacitor.

Referring to FIG. 1, a capacitor 10 includes a capacitive element 12 inside an airtight, oval steel can 14 having a cover 16 in which two terminal assemblies 18 are mounted.

Figure 2:
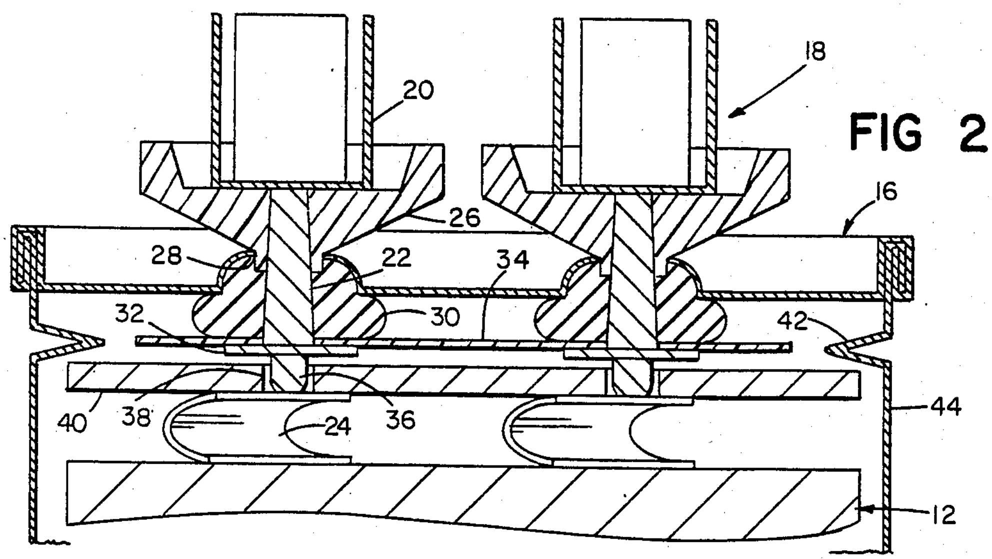
FIG. 2 is a sectional side view, partially broken away, along 2—2 of FIG. 1.

Referring to FIG. 2, terminals 20 are electrically connected to capacitive element 12 via steel terminal rivets 22 spot welded to aluminum tabs 24.

Terminals 20 are seated in plastic bushings 26 which are in turn seated in and extend through holes 28 in cover 16. On the inner side of cover 16 rivet gaskets 30 surround rivets 22 and provide an airtight seal between gaskets 30, rivets 22, bushings 26, and holes 28. Gaskets 30 and bushings 26 are held in place by the combination of the clamping action of rivet shoulders 32 and the welding of terminals 20 to rivets 22.

A paper cover insulator 34 lies between heads 32 and gaskets 30.

Rivet tips 36 extend through and protrude beyond holes 38 in phenolic laminate interrupter panel 40.

The side walls 44 of can 12 have indentations 42 that extend inward from side walls 44 of can 12 and above a portion of panel 40, so that indentations 42 limit panel 40 from rising above the level of the indentations.

Assembly

Terminal assemblies 18 are assembled and mounted on cover 16 by inserting rivet 22 through insulator 34, gasket 30, cover 16, and bushing 26 and welding terminal 20 to the top of rivet 22 while applying a clamping force between rivet shoulder 32 and terminal 20. Rivet tips 36 are then inserted through holes 38 in panel 40. Tabs 24 (previously connected to capacitive element 12) are spot welded to tips 36.

The completed assembly is lowered into a can 14 in which indentations 42 have not yet been formed. Cover 16 and can 14 are then crimped together and indentations 42 are formed.

Operation

Figure 4:
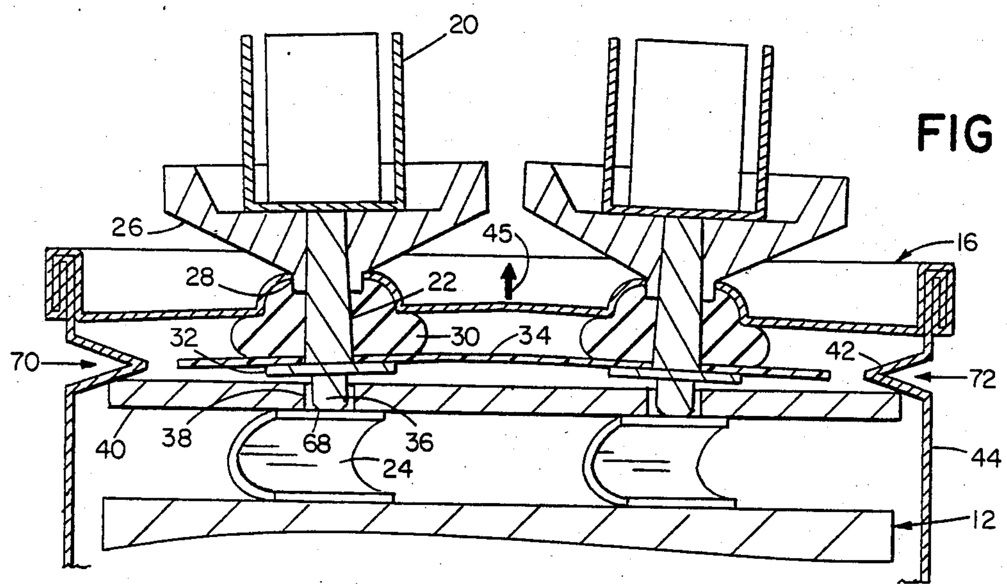
FIGS. 4, 5 are the same views as in FIG. 2 showing a bulging cover respectively before and after the breaking of the internal connections.

Referring to FIG. 4, when internal pressure in can 14 increases, cover 16 bulges upward (as suggested by arrow 45). Terminal assemblies 18 also move upward with bulging cover 16 causing an upward force to be exerted on points 68 where tabs 24 are spot welded to tips 36. Tabs 2 are drawn upward until they come in contact with interrupter panel 40 and, continuing upward, lift panel 40 against indentations 42 (as shown).

Indentations 42, in response to continued upward movement of panel 40, exert a downward resistive force which restrains panel 40 from rising further.

Any additional upward movement of terminal assemblies 18 causes increased force to be exerted at points 68, which is resisted by the force imposed in the opposite direction by panel 40.

Figure 5:
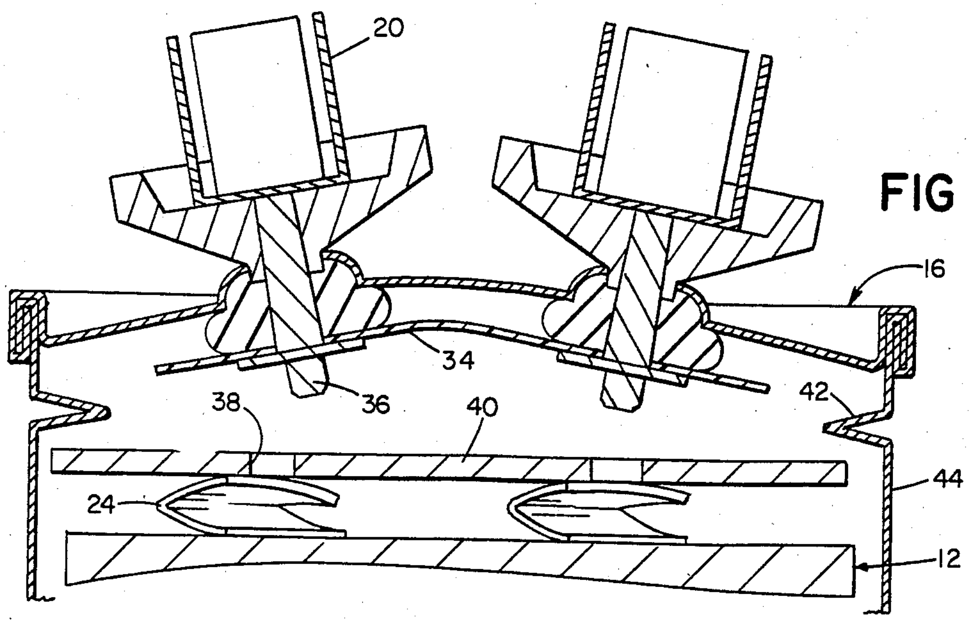

Referring to FIG. 5, the increased force at points 68 eventually causes tabs 24 to tear away from tips 36. This breaks the electrical connection between terminals 20 and capacitive element 12, halting operation of the capacitor and in turn halting the generation of gases and the buildup of internal pressure.

Upon the tearing of the welds at points 68, panel 40, along with tabs 24, falls downward towards element 12 and away from terminals 20 and indentations 42.

Figure 3:
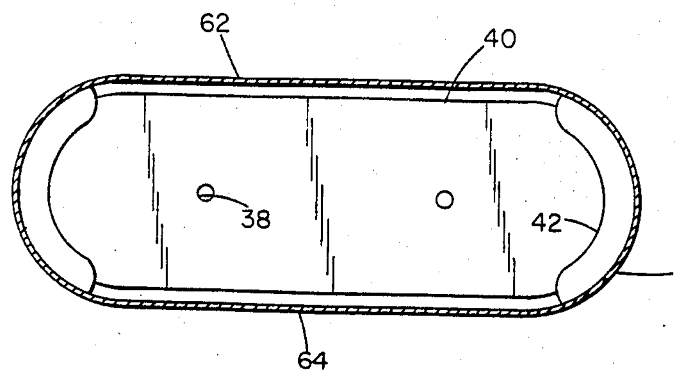
FIG. 3 is a top view of the capacitor of FIG. 1 with the lid and terminals removed.

In the case of an oval capacitor can 14, internal can pressure causes outward bulging of the two longer, flat can sides (62, 64 in FIG. 3) and a corresponding inward collapse of the two shorter curved can ends (in which the indentations 42 have been formed). This causes the indentations to move inward (as suggested by arrows 70, 72 in FIG. 4). This inward motion combined with the wedge shape of the indentations produces downward motion of panel 40 simultaneously with the upward bulging of cover 16 thus actively contributing to the breaking of the electrical connections.

Other Embodiments

Other embodiments are within the following claims.

Figure 6:
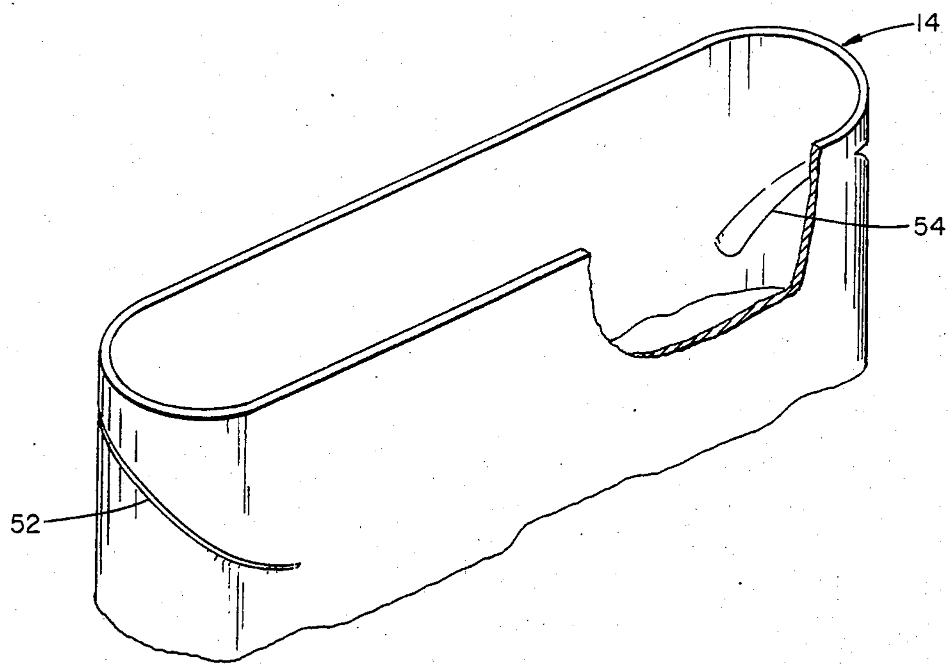
FIG. 6, 7 are, respectively, a perspective view from above, and a side view of another embodiment.
Figure 7:
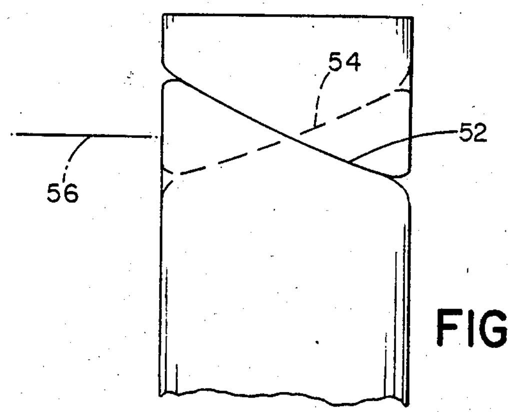

For example, referring to FIGS. 6, 7, indentations 52, 54 can be oriented at equal and opposite angles to a horizontal plane 56 generally parallel with cover 16.

Figure 8:
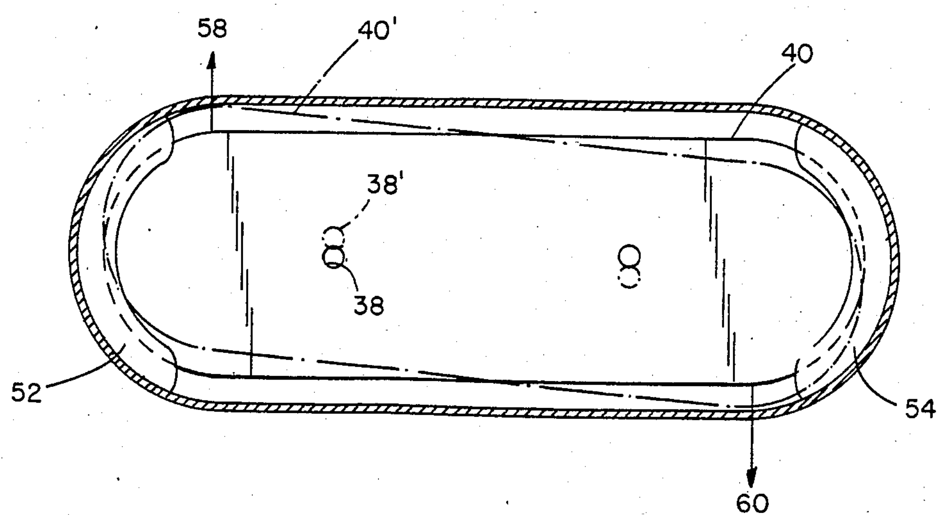
FIG. 8 is a top view of the embodiment of FIGS. 6, 7, with the lid and terminals removed.

Referring to FIG. 8, as cover 16 bulges and interrupter panel 40 is drawn up against indentations 52, 54, before the welds are broken, part of the upward force on panel 40 is translated into equal and opposite lateral forces (suggested by arrows 58, 60) on opposite ends of panel 40, effectively rotating it as it rises.

Once panel 40 has reached its final position (indicated as 40') further bulging causes the welds between tabs 24 and tips 36 to tear.

Panel 40 comes to rest on top of tabs 24 and element 12 and retains the rotational displacement imparted to it as it was lifted against indentations 52, 54.

If the internal pressure in can 14 were then to decrease and the terminals were to descend, tips 36 would no longer be aligned with the new position 38' of holes 38, reducing the chance of reconnection. Thus the electrical pathways provided by the holes in panel 40 are distorted so that the terminals cannot reach the electrical conductors.

What is claimed is:

1. A capacitor comprising
   a capacitive element,
   a hollow body containing said element and having walls comprising
      a first wall portion arranged to bulge in a predetermined direction when said body is subjected to internal pressure, and
      a second wall portion which does not move in said predetermined direction when said body is subjected to internal pressure,
   electrical terminals attached to said first wall portion and arranged to move with said first wall portion in said predetermined direction,
   electrical connections between said terminals and said capacitive element, and
   disconnect means associated with said second wall portion and arranged such that when said first wall portion bulges, said terminals exert a force in said predetermined direction on said electrical connections, and said disconnect means exerts a resisting force to sever said electrical connections,
   said disconnect means comprising
      a rigid interrupter means which is movable in said predetermined direction within said body, and
      hold means fixed to said second wall portion and operable to resist the motion of said interrupter means in said predetermined direction when said first wall portion bulges.

2. The capacitor of claim 1, wherein said interrupter means comprises
   an insulating panel having holes through which said terminals extend, and
   wherein said electrical connections include electrical conductors that cannot move beyond said interrupter means in said predetermined direction,
   said electrical connections including breakable connections that are located on a side of said interrupter means opposite said first wall portion, said breakable connections being configured to prevent said conductors from passing through said holes.

3. A capacitor comprising
   a capacitive element,
   a hollow body containing said element,
   electrical terminals mounted on said body and each connected by a conductor via a predefined pathway to said element,
   means for disconnecting said electrical terminals from said element upon failure of said capacitor, and
   solid means for blocking said pathway to prevent reconnection of said conductor following disconnection.

4. The capacitor of claim 3 wherein
   said disconnecting means severs said conductor and establishes a gap between the severed ends of said conductor, and said blocking means comprises an insulative member interposed in said gap.

5. The capacitor of claim 4 wherein said insulative member includes an aperture defining a portion of said predetermined pathway.

6. The capacitor of claim 5 wherein said means for disconnecting causes said aperture to be dislocated.

7. The capacitor of claim 6 wherein said insulative member is rotated by said disconnecting means about an axis perpendicular to said member.

8. The capacitor of claim 4 wherein said insulative member is a rigid panel.

9. A capacitor comprising a capacitive element, a hollow body containing said element and having walls comprising a first wall portion arranged to bulge in a predetermined direction when said body is subjected to internal pressure, and a second wall portion which does not move in said predetermined direction when said body is subjected to internal pressure, electrical terminals attached to said first wall portion and arranged to move with said first wall portion in said predetermined direction, electrical connections between said terminals and said capacitive element, and disconnect means associated with said second wall portion and arranged such that when said first wall portion bulges, said terminals exert a force in said predetermined direction on said electrical connections, and said disconnect means exerts a resisting force to sever said electrical connections, said disconnect means comprising an interrupter means which is movable in said predetermined direction within said body, and hold means fixed to said second wall portion and operable to resist the motion of said interrupter means in said predetermined direction when said first wall portion bulges, said electrical connections being severed at a location on the capacitive element side of said interrupter means.

10. The capacitor of claim 1 or 9 wherein said electrical connections include electrical conductors that cannot move beyond said interrupter means in said predetermined direction.

11. The capacitor of claim 1 or 9 wherein said hold means comprises projections extending from said second wall portion into the interior of said body, said projections being located between said interrupter means and said first wall portion.

12. The capacitor of claim 11 wherein said projections are indentations in said second wall portion.

13. The capacitor of claim 11 wherein said projections comprise surfaces arranged to bear against said interrupter means, said surfaces being inclined relative to said second wall portion.

14. The capacitor of claim 1 or 9 wherein said body comprises a can and said first wall portion comprises a cover of said can.

15. The capacitor of claim 14, wherein said second wall portion comprises side walls of said can.

16. The capacitor of claim 1 or 9 wherein said hold means causes motion of said interrupter means in the opposite direction from said predetermined direction when said capacitor is subjected to internal pressure.

17. A capacitor comprising:

a capacitive element, a hollow body containing said element and having walls comprising a first wall portion arranged to bulge in a predetermined direction when said body is subjected to internal pressure, and a second wall portion which does not move in said predetermined direction when said body is subjected to internal pressure, electrical terminals attached to said first wall portion and arranged to move with said first wall portion in said predetermined direction, electrical connections between said terminals and said capcitive element, and disconnect means associated with said second wall portion and arranged such that when said first wall portion bulges, said terminals exert a force in said predetermined direction on said electrical conductors, and said disconnect means exerts a resisting force to sever said electrical connections, said disconnect means comprising an interrupter means which is movable in said predetermined direction within said body, and hold means fixed to said second wall portion and operable to resist the motion of said interrupter means in said predetermined direction when said first wall portion bulges, said electrical connections including electrical conductors that cannot move beyond said interrupter means in said predetermined direction.

18. A capacitor comprising:

a capacitive element, a hollow body containing said element and having walls comprising a first wall portion arranged to bulge in a predetermined direction when said body is subjected to internal pressure, and a second wall portion which does not move in said predetermined direction when said body is subjected to internal pressure, electrical terminals attached to said first wall portion and arranged to move with said first wall portion in said predetermined direction, electrical connections between said terminals and said capcitive element, and disconnect means associated with said second wall portion and arranged such that when said first wall portion bulges, said terminals exert a force in said predetermined direction on said electrical conductors, and said disconnect means exerts a resisting force to sever said electrical connections, said disconnect means comprising an interrupter means which is movable in said predetermined direction within said body, and hold means fixed to said second wall portion and operable to resist the motion of said interrupter means in said predetermined direction when said first wall portion bulges, said hold means comprising projections extending from said second wall portion into the interior of said body, said projections being located between said interrupter means and said first wall portion.

19. A capacitor comprising:

a capacitive element, a hollow body containing said element and having walls comprising
a first wall portion arranged to bulge in a predetermined direction when said body is subjected to internal pressure, and
a second wall portion which does not move in said predetermined direction when said body is subjected to internal pressure,
electrical terminals attached to said first wall portion and arranged to move with said first wall portion in said predetermined direction,
electrical connections between said terminals and said capcitive element, and
disconnect means associated with said second wall portion and arranged such that when said first wall portion bulges, said terminals exert a force in said predetermined direction on said electrical conductors, and said disconnect means exerts a resisting force to sever said electrical connections,
said disconnect means comprising
an interrupter means which is movable in said predetermined direction within said body, and
hold means fixed to said second wall portion and operable to resist the motion of said interrupter means in said predetermined direction when said first wall portion bulges, and
wherein said interrupter means comprises an insulating panel having holes through which said terminals extend, and said electrical connections include electrical conductors that cannot move beyond said interrupter means in said predetermined direction,
said electrical connections including breakable connections that are located on a side of said interupter means opposite said first wall portion, said breakable connections being configured to prevent said conductors from passing through said holes.

20. A capacitor comprising:
a capacitive element,
a hollow body containing said element and having walls comprising
a first wall portion arranged to bulge in a predetermined direction when said body is subjected to internal pressure, and
a second wall portion which does not move in said predetermined direction when said body is subjected to internal pressure,
electrical terminals attached to said first wall portion and arranged to move with said first wall portion in said predetermined direction,
electrical connections between said terminals and said capcitive element, and
disconnect means associated with said second wall portion and arranged such that when said first wall portion bulges, said terminals exert a force in said predetermined direction on said electrical conductors, and said disconnect means exerts a resisting force to sever said electrical connections,
said disconnect means comprising
an interrupter means which is movable in said predetermined direction with said body, and
hold means fixed to said second wall portion and operable to resist the motion of said interrupter means in said predetermined direction when said first wall portion bulges,
wherein said body comprises a can and said first wall portion comprises a cover of said can.

21. A capacitor comprising:
a capacitive element,
a hollow body containing said element and having walls comprising
a first wall portion arranged to bulge in a predetermined direction when said body is subjected to internal pressure, and
a second wall portion which does not move in said predetermined direction when said body is subjected to internal pressure,
electrical terminals attached to said first wall portion and arranged to move with said first wall portion in said predetermined direction,
electrical connections between said terminals and said capcitive element, and
disconnect means associated with said second wall portion and arranged such that when said first wall portion bulges, said terminals exert a force in said predetermined direction on said electrical conductors, and said disconnect means exerts a resisting force to sever said electrical connections,
wherein said disconnect means comprises
an interrupter means which is movable in said predetermined direction within said body, and
hold means fixed to said second wall portion and operable to resist the motion of said interrupter means in said predetermined direction when said first wall portion bulges,
said hold means causing motion of said interrupter means in the opposite direction from said predetermined direction when said capacitor is subjected to internal pressure.

22. A capacitor comprising
a capacitive element,
a hollow body containing said element,
electrical terminals mounted on said body and each connected by a conductor via a predefined pathway to said element,
means for disconnecting said electrical terminals from said element upon failure of said capacitor, and
means for blocking said pathway to prevent reconnection of said conductor following disconnection wherein said insulative member includes an aperture defining a portion of said predetermined pathway.

23. A capacitor comprising
a capacitive element,
a hollow body containing said element,
electrical terminals mounted on said body and each connected by a conductor via a predefined pathway to said element,
means for disconnecting said electrical terminals from said element upon failure of said capacitor, and
means for blocking said pathway to prevent reconnection of said conductor following disconnection wherein said insulative member is a rigid panel.

* * * * *